Nov. 8, 1955  J. G. DWYER  2,722,837
PRESSURE GAUGE
Filed Nov. 10, 1950  3 Sheets-Sheet 1

INVENTOR.
James G. Dwyer
BY
Mann, Brown and Hausmann
Attys.

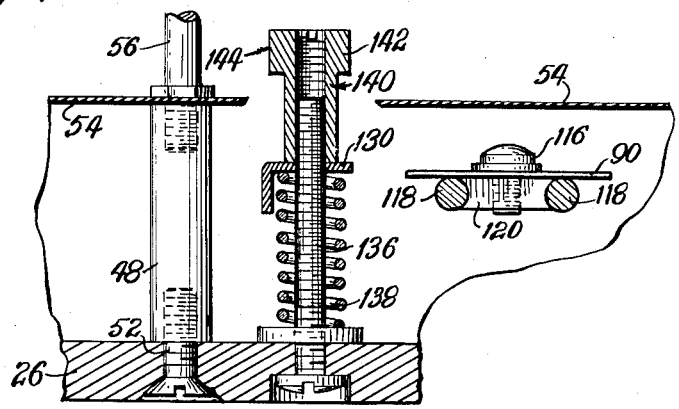
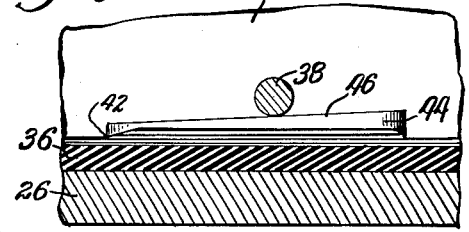
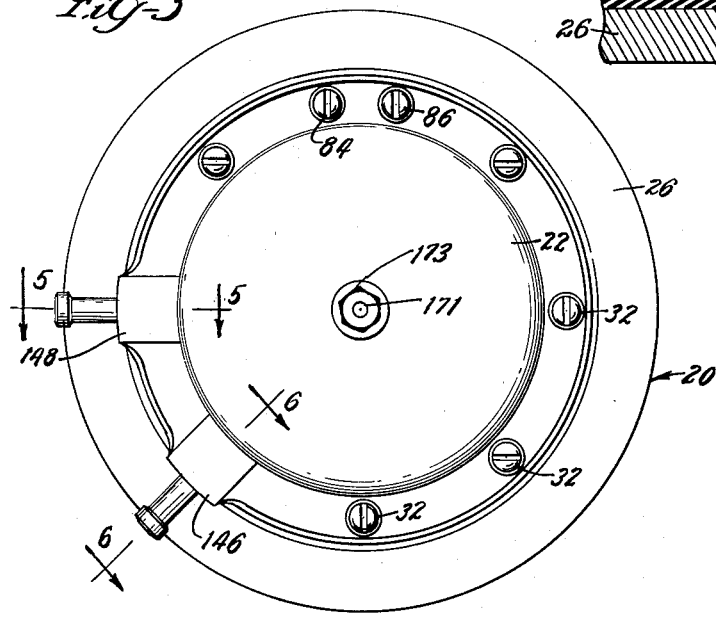

Nov. 8, 1955 J. G. DWYER 2,722,837
PRESSURE GAUGE
Filed Nov. 10, 1950 3 Sheets-Sheet 3
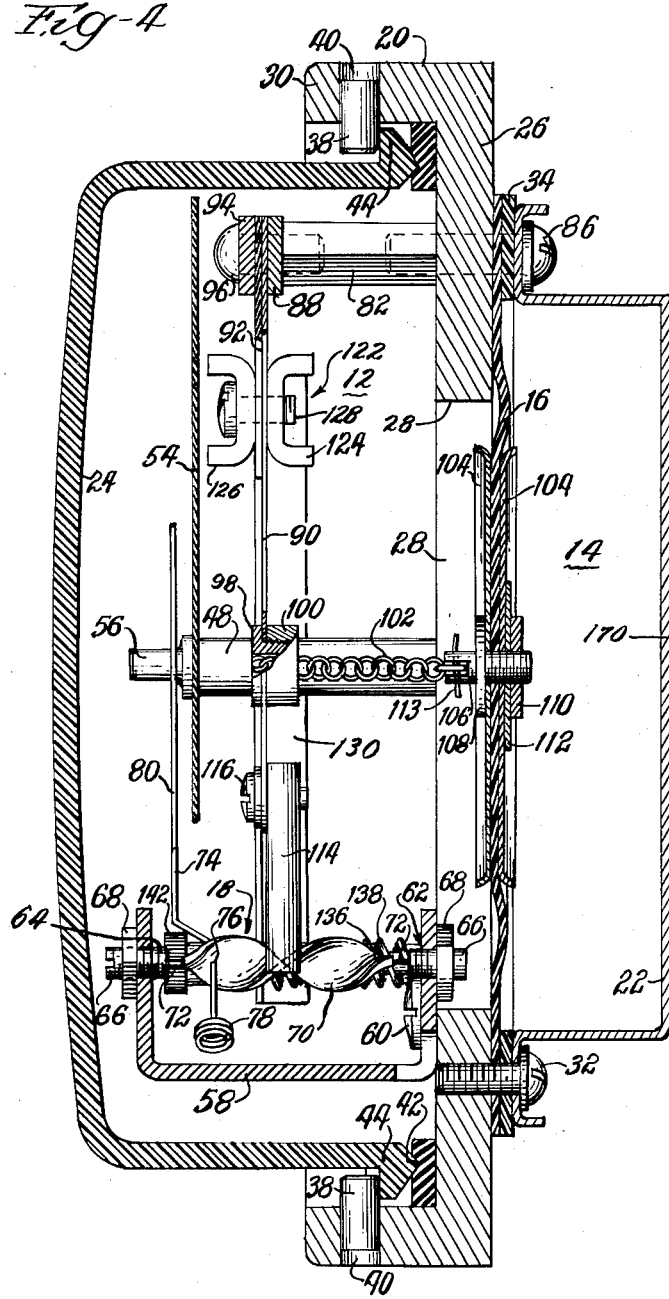
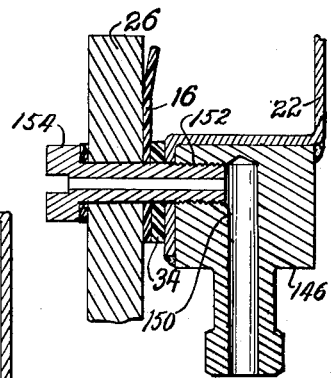
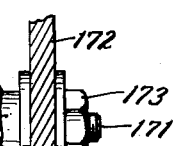
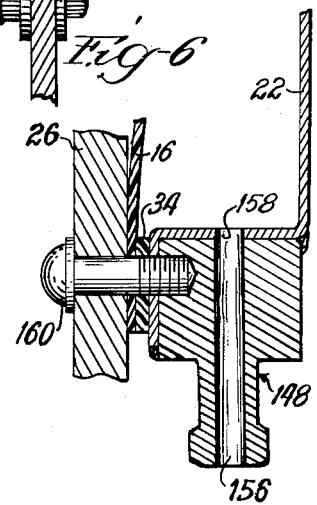
INVENTOR.
James G. Dwyer
BY
Mann, Brown and Hansuran
Attys.

United States Patent Office 2,722,837
Patented Nov. 8, 1955

2,722,837

PRESSURE GAUGE

James G. Dwyer, Deerfield, Ill., assignor to F. W. Dwyer Manufacturing Company, a corporation of Illinois Application November 10, 1950, Serial No. 195,111

8 Claims. (Cl. 73—407)

The present invention relates to gauges, particularly pressure gauges of the diaphragm type adapted to measure pressure differentials.

Primarily, the object of the invention is to provide a sensitive, highly accurate, durable, compact, quick acting, and inexpensive pressure gauge for measuring absolute or differential pressures.

Another object of the present invention is to provide a simple, yet effective, way to calibrate the gauge. To this end, a cantilever spring is provided which is so arranged as to be moved by the physical effect to be measured, the calibration of the gauge being effected by varying the point of fulcrum of the cantilever spring.

In devices of this type it is important to eliminate friction between component elements of the gauge. This is accomplished in the present invention by having the indicating member of the gauge operatively connected to the primary movable force responsive element by a magnetic coupling which includes a magnet and a rotatable helix, the magnet being so disposed with respect to the helix that linear movement of the magnet along an axis parallel to the axis of rotation of the helix causes rotary movement of the helix.

An additional object of the invention is to provide zero setting means, that is, means for setting the indicating pointer at zero on the scale of the gauge. In utilizing the cantilever spring mentioned hereinbefore and the particular motion translating device referred to, adjustment of the indicator to its zero point is effected by varying the disposition of the cantilever spring so as to vary the disposition of the magnet with respect to the rotatable helix.

Other objects and advantages will become apparent in the following description of a particular embodiment of the invention, reference being had in the description to the accompanying drawings, in which:

Figure 3 is a bottom view of the pressure gauge shown in Figure 1;

Figure 4 is an enlarged, cross-sectional view of the gauge taken on line 4—4 of Figure 1;

Figure 5 is a cross-sectional view on an enlarged scale of conduit and coupling means for establishing communication between the gauge and a source of pressure, and taken on line 5—5 of Figure 3;

Figure 6 is a cross-sectional view on an enlarged scale of second conduit and coupling means for establishing communication between the gauge and a second source of pressure, and taken on line 6—6 of Figure 3;

Figure 1:
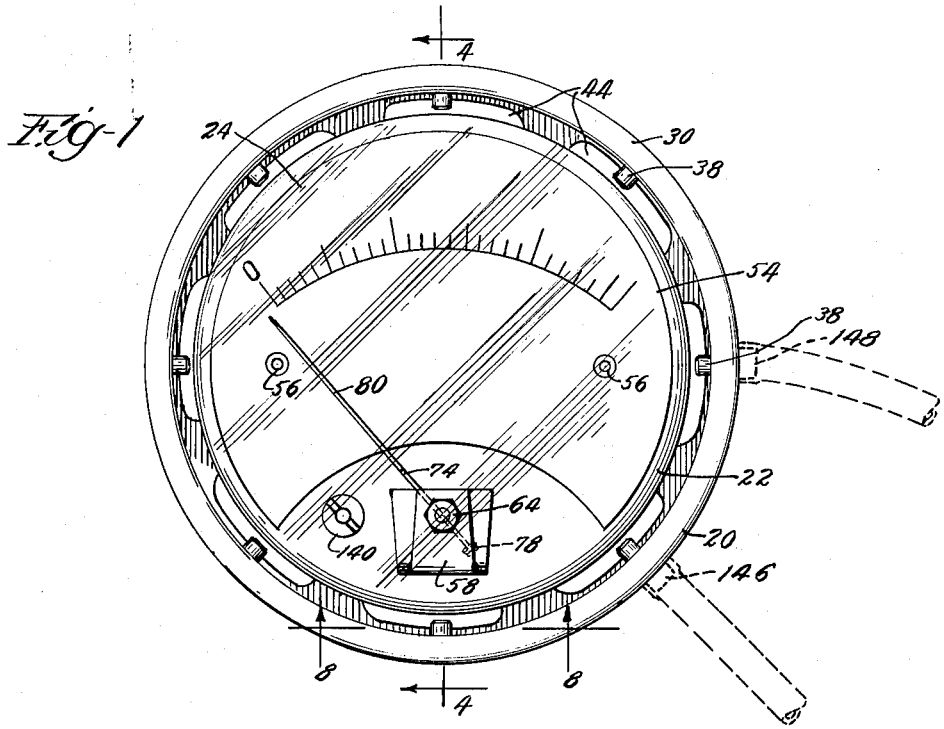
Figure 1 is a plan view of a diaphragm type pressure gauge embodying the present invention.
Figure 2:
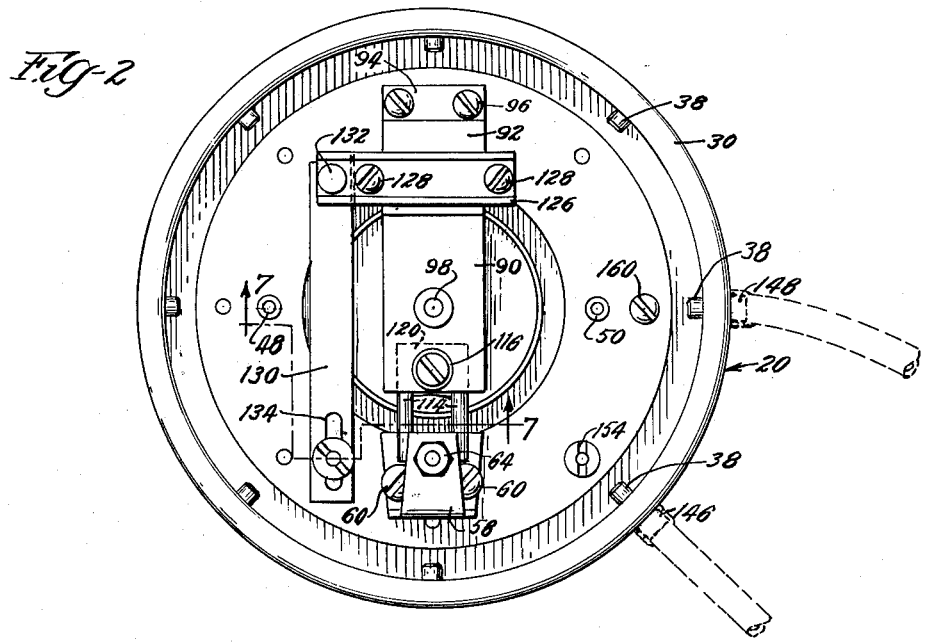
Figure 2 is a view similar to Figure 1 with the top cover, pointer and indicating scale of the gauge removed.

Figure 7 is an enlarged detail view in cross-section of the magnet and its mounting, the zero setting mechanism, and the supports for the instrument scale, taken on line 7—7 of Figure 2, but with some parts omitted for clarity; and Figure 8 is an enlarged detail view in cross-section of the means for releasably securing a cover in sealing relationship to the body of the gauge, the view being taken on the line 8—8 of Figure 1.

Referring to the drawings, and particularly to Figure 4, the present invention, as embodied in a pressure gauge of the diaphragm type, comprises a housing divided into two compartments 12 and 14 by a diaphragm 16. An indicating means, indicated generally by the reference numeral 18, is positioned within chamber 12 and is arranged to be actuated by movement of the diaphragm 16 in one direction. Coupling means are provided for establishing communication between one side of the diaphragm 16 and a first source of pressure. Additional coupling means are provided for establishing communication between the opposite side of the diaphragm and a second source of pressure so that the diaphragm is subject to and moved by the differential in the two pressures acting upon its opposite surfaces.

The housing consists of a base 20, a first cup-shaped housing 22 and a second cup-shaped housing or cover 24. The base 20 consists of a circular plate 26 provided with a central aperture 28 and having a peripheral flange 30 projecting outwardly from one surface thereof. The cup-shaped housing 22 is provided with a laterally extending flange which is secured to the side of the base 20 opposite that of the flange 30 by fasteners or bolts 32 which extend through the housing flange and into threaded bores in the plate 26. The diaphragm 16, which is a preformed diaphragm of plastic, rubber, synthetic rubber, or metal, is secured to the base 20 between the plate 26 and the lateral flange of housing 22. A ring-shaped gasket 34 is preferably positioned between the diaphragm and the housing 22 to form a seal between the housing 22 and the plate 26. The housing 24 comprises a transparent plastic cap adapted to be releasably secured to the base 20. A rubber gasket 36 in the form of an annular ring is positioned on the upper surface of the plate 26 and is bounded about its periphery by the flange 30. A plurality of pins 38 are press-fit into radial bores 40 provided in the flange 30, the pins projecting inwardly from the flange 30 and being spaced from the surface of the plate 26. The plastic cap 24 is provided at its lower margin with a knife edge 42 adapted to engage and be forced into the gasket 36 for the purpose of forming a seal between the cap 24 and the base 20.

The plastic cap 24 is provided about its periphery with a plurality of spaced projections 44 which have an inclined upper surface 56 forming a cam, as shown in Figure 8. The cam surfaces 46 engage the underside of the pins 38 so that as the cap is rotated in a given direction with respect to the base 20 the pins 38 acting on the cam surfaces 46 force the knife edge 42 of the cap into compressed engagement with the rubber gasket 36 to form a seal between the base 20 and the cap 24.

As will now be fully realized, the housing 22 and diaphragm 16 form a lower fluid-tight chamber 14, and the cap 24, together with the base 20 and diaphragm 16 form an upper fluid-tight chamber 12. The indicating means 18 is positioned entirely within the upper chamber 12 and is visible through the transparent plastic cap 24.

Two posts 48 and 50 are secured to the circular plate 26 of the base 20 by means of screws 52 which extend through the plate and clamp the posts thereto (see Figure 7). The posts 48 and 50 are provided at their upper ends with threaded bores adapted to receive screws therein. An indicating scale 54, in the form of a crescent, is positioned over the posts and supported thereby, screws 56 being provided for securing the indicator scale to the posts. The screws 56 are preferably provided with stems extending upwardly from the surface of the indicating scale for the purpose of defining the range of movement of the indicating pointer. The posts 48 and 50 are of sufficient height to provide space below the scale 54 for the indicating means 18, the scale being crescent shape so that the pointer may project thereabove and access may be had to the zero setting means.

A bracket 58 is secured to the upper surface of the plate 26 at a point substantially equidistant from each of the posts 48 and 50. The bracket 58 is U-shaped and is secured to the plate 26 by means of screws 60 extending through one of the legs of the bracket and being threadably received within bores in the plate. The bracket 58 is so mounted with respect to the plate 26 that the legs project beyond the inner margin of the plate and above the aperture 28. Adjustably mounted within the extending portions of the legs are a pair of jeweled pivots 62 and 64. The pivots comprise a threaded stud 66 having a central bore within which the jewel is mounted, a nut 68 being provided to secure the studs in adjusted position. Rotatably mounted between the jeweled bearings 62 and 64 is a spiral or helix 70 of soft iron. A shaft 72 projects from each end of the helix 70 for reception within the jeweled bearings 62 and 64. An indicating pointer 74 is fixedly secured to the helix 70, it being preferred that the pointer project through a hole 76 in the helix, and be fixedly secured to the helix as by soldering.

The indicating pointer preferably comprises a short brass wire which, as stated before, is secured to the helix 70 and is provided at one end with a coiled portion 78 which counterbalances the pointer. The other end of the wire is bent in the manner shown so as to project above the scale 54. The actual indicating hand consists of an aluminum tube 80 which is press-fit onto the straight end of the brass wire. By utilizing this construction the pointer has low inertia and is sufficiently light to minimize the load carried by the jeweled pivots 62 and 64.

A pair of standards 82 are mounted on the upper surface of the plate 26 diametrically opposite the bracket 58. The standards 82 are secured to the plate 26 by means of the fasteners 32 which secure the lower housing 22 to the base 20, the particular fasteners 84 and 86 for securing the standards to the plate being substantially longer than the remainder of the fasteners 32. A first cross-bar 88 is supported by the standards 82 and bridges the distance between the two standards. A leaf spring 90 is supported by the standards 82 in cantilever fashion and is positioned above the cross-bar 88. A stiffening plate 92 is likewise supported by the standards 82 and extends therefrom in contact with the cantilever spring 90 throughout a portion of the length of the spring. A second cross-bar 94 is positioned above the stiffening plate 92, and screws 96 are provided for securing the cross-bar 88, the cantilever spring 90, the stiffening plate 92, and the cross-bar 94 to the standards 82.

A stud 98, aligned substantially with the axis of the gauge, extends through the cantilever spring 90 and is secured thereto by a threaded annulus 100. One end of a chain 102 is secured to the stud 98, the chain depending from the stud. A pair of dish-shaped discs 104 are provided engaging opposite sides of the diaphragm 16. A stud 106 having an annular flange 108 engaging the upper disc 104 extends through the two discs and the diaphragm 16, the discs being secured to the diaphragm by means of the stud 106 and a nut 110 threaded thereon. A washer 112 is confined between the nut 110 and the lower disc 104. The stud 106 is bifurcated at its upper end for the reception therein of the last link of the chain 102, the chain being secured within the bifurcated portion of the stud by means of a pin 113. The chain 102 connects the cantilever spring 90 to the diaphragm 16 for movement therewith when the diaphragm is subjected to a differential pressure. It is particularly advantageous to use a chain as a motion transmitting element, as will be more particularly pointed out hereinafter.

A magnet 114 is secured to the free end of the cantilever spring 90 by means of a screw 116. As is shown in Figure 7, the magnet consists of a pair of rods or legs 118 extending outwardly from a shoe 120. The rods and shoe form a U-shaped magnet having the legs thereof projecting to either side of the rotatably mounted helix 70. As the magnet is moved with respect to the helix, the helix will tend to rotate so as to maintain a constant and minimum air gap between the edges of the helix and the legs or poles of the magnet.

The point of fulcrum of the cantilever spring is determined by the position of an adjustable clamp, indicated generally at 122. The clamp comprises a pair of calibrating channels 124 and 126 which span the spring 90 and the stiffening plate 92. The calibrating channels are clamped about the spring 90 and plate 92 by means of screws 128. The stiffening plate 92 is a relatively inflexible member to which the leaf spring 90 is secured by the clamp 122 to determine the point of fulcrum of the spring 90. By loosening the screws 128 the calibrating channels 124 and 126 may be moved longitudinally of the plate 92 and spring 90 and clamped at various positions throughout the length of the plate 92 to vary the point of fulcrum of the spring 90. The deflection of the spring 90 for a given force is determined by its fulcrum point and therefore the movement of the spring in response to various pressure differentials acting on the diaphragm 16 may be calibrated by adjustment of the clamp 122.

The upper calibrating channel 126 is somewhat longer than the lower calibrating channel 124 and an arm 130 is fixedly secured to the projecting end of the upper channel by means of a rivet 132. The arm extends substantially parallel to, and spaced from, the springs 90. The arm 130 is formed of an angle member so as to be rigid. A slot 134 is provided in the arm 130 at the end thereof opposite the point of affixation to the channel 126. A threaded post 136 is secured to the plate 26 and extends upwardly therefrom. A helically coiled spring 138 encompasses the threaded post 136 and supports the arm 130, the threaded post extending through the slot 134 in the arm. A nut 140 is threadably secured to the threaded post 136 and is provided with an enlarged head 142 which is knurled as at 144, for manual adjustment to vary the point of support of the arm 130.

Adjustment of the nut 140 with respect to the post 136 will vary the vertical point of support of the arm 130. When the vertical support of the arm is varied, the arm causes the clamp 122 to be tilted, thereby varying the vertical disposition of the cantilever spring 90 and the magnet 114 with respect to the rotatable helix 70. This change of vertical disposition will cause rotation of the helix 70 so as to effect movement of the indicating pointer 80, whereby the pointer may be manually set at the zero point on the indicator scale 54. The slot 134 is provided in the arm 130 so as to avoid interference with the longitudinal adjustment of the clamp 122 with respect to the spring 90 and plate 92.

As is clearly shown in Figures 3, 5 and 6, a pair of tubing connections 146 and 148 are provided for connecting the gauge to two sources of pressure. The tubing connections are fixedly secured to the cup-shaped housing 22 by welding or by brazing, and consist each of an integral block and hollow projecting stem having an enlarged head for the reception of a flexible conduit thereover. The tubing connection 146 is provided with a central bore 150 extending nearly to the end of the block. A threaded bore 152 communicates with the bore 150 and also with mating holes in the housing 22 and plate 26. A tubular stud 154 provided with a screwdriver slot passes through the holes in the plate 26 and housing 22 and is threadably received within the bore 152 in the block of the connection 146 for establishing communication between the bore 150 and the upper side of the diaphragm 16. The stud 154 also assists in securing the housing 22 to the base plate 26. The other connection 148 is provided with a bore 156 which communicates with an aperture 158 in the wall of the housing 22 for establishing communication with the lower side of the diaphragm 16. A bolt 160 extends through the plate 26 and into the block of the connection 148 to secure the housing 22 to the plate 26.

Having now described in some detail the mechanical construction of the device, the operation of the gauge will be fully described. According to choice, the tubing connections 146 and/or 148 are connected to sources of pressure. If it is desired to measure a pressure less than atmospheric, communication is established between that source of pressure and the lower chamber 14 of the gauge by means of a flexible conduit connected to the tubing connection 148. The upper chamber 12 of the gauge will then communicate with atmosphere through the tubular stud 154 and the connector 146. If it is desired to measure a pressure in excess of atmospheric pressure, communication is established between that source of pressure and the upper chamber through a flexible conduit slipped over the stem of the connection 146, the lower chamber 14 communicating with atmosphere through the connection 148. If it is desired to measure the difference in two pressures, the source of greater pressure is made to communicate with the upper chamber through the connection 146, and the source of lesser pressure is made to communicate with the lower chamber through the connection 148. Regardless of the pressure to be measured, it must be borne in mind that the greater pressure should be exerted on the upper side of the diaphragm so that the diaphragm will be moved downwardly.

As the diaphragm is moved downwardly by the pressure exerted on the upper surface thereof, the motion is transmitted to the cantilever spring 90 and magnet 114 by means of the chain 102. As the magnet is moved downwardly with respect to the helix 70, the helix rotates so as to maintain a minimum air gap between its edges and the poles of the magnet. The downward movement of the diaphragm 16 is resisted by the spring 90 according to the calibration thereof, the magnet therefor moving only a distance representative of the force exerted on the diaphragm so that the helix is rotated only to the extent that the pointer is moved to the proper indication on the scale 54, indicating the pressure differential exerted on the diaphragm 16.

It is particularly advantageous in a construction of this type to utilize a chain or other collapsible tension member as the means for transmitting motion of the diaphragm to the cantilever spring 90, since there is no necessity in such a construction for having the points of affixation of the chain in perfect alignment. In addition, the spring in its movement transcribes an arc and the flexibility of the chain readily allows for the misalignment of the points of affixation of the chain, whereas such would not be the case were the spring and diaphragm interconnected by a rigid member.

The chain, however, is capable of transmitting only downward movement of the diaphragm to the spring and only upward movement of the spring to the diaphragm, it being clear, of course, that the spring returns the diaphragm to its normal position through the chain 102 when the pressure differential is removed from the diaphragm. This arrangement is advantageous since the point of fulcrum of the spring 90, as defined by the clamp 122, is effective only upon downward deflection of the spring 90. In view of this fact, it is essential that the greater pressure be exerted upon the upper surface of the diaphragm so that same will be moved downwardly.

Although a chain is preferred, it will be understood that a rigid member could be substituted for the chain (with certain modifications in structure) if desired.

By providing means for varying the fulcrum of the cantilever spring, the effective stiffness of the spring 90 is controlled, which in turn provides for calibrating the gauge. In view of this fact, it is unnecessary when manufacturing the cantilever spring to establish extremely close tolerances with regard to the force to be exerted by the spring since the calibrating means will allow for wide variation in manufacture of the spring and yet insure perfect calibration of the gauge. Furthermore, leaf springs of the general type utilized in the present construction are subject to loss of resiliency after continued periods of use. The effective life of the spring is materially increased by providing the calibrating means so that even if the spring does lose some of its resilient characteristics it may still be re-calibrated very readily for continued use.

In shipment and in use, gauges are often subject to shocks and impacts which cause the indicating pointer to be moved away from the zero point on the scale. The zero setting means provided herein present a readily accessible, easily adjusted means for quickly and accurately resetting the pointer to the zero point on the indicating scale.

The permanent magnet and soft iron helix provide a device for substantially frictionlessly translating linear motion into rotary motion, thusly relieving any stress or strain on the bearings for the helix and improving the life thereof. In addition, the translating device provides for extremely accurate actuation of the indicating pointer.

All of the operating mechanism of the gauge is positioned within the upper chamber 12, which chamber is formed by the clear plastic cap 24. The plastic cap is readily removable from the base of the gauge by merely giving a partial rotation thereto with respect to the base. Upon removal of the plastic cap 24, the zero setting nut 140 is readily accessible for adjustment, since it projects above the level of the scale 54. To obtain access to the remainder of the operating parts of the gauge it is only necessary to remove the screws 56 securing the indicator scale to the posts 48 and 50. Upon removal of this scale, the motion translating device, the connection between the diaphragm and the spring, and, most particularly, the calibrating means, are fully exposed.

Little attention has been given in the preceding description to the material from which the various component parts of the gauge should preferably be formed. In this respect, it is to be pointed out that the critical components are the helix, the magnet and the cantilever spring. The preferred materials for these components are soft iron, Alnico, and blue spring steel respectively. It is preferred that the remainder of the parts be formed of non-ferrous materials so as to avoid any extraneous effect on the action of the magnet and the helix, but this preference need not be adhered to for satisfactory performance of the gauge.

To prevent any appreciable twisting action on spring 90 effected by the zero setting means, it is advisable to form the stiffening plate 92 of blue spring steel also. It has been found that a plate .015 to .023 inch thick is entirely adequate when used with a cantilever spring .005 inch thick.

The helix 70 has been shown in the accompanying drawings as having a uniform twist, spiral or curvature. Variations in the curvature of the helix will result in different ratios of translation of linear movement to rotary movement. It is seen, then, that various relationships, for example, linear, logarithmic, and the like, can be established by those skilled in the art by suitably curving the helix.

For convenience in mounting the gauge, the housing 22 may be provided with an inwardly extending flanged lug 170 having a threaded shank 171 adapted to pass through a support wall 172 and be secured thereto by a nut 173.

The present invention has been described in great particularity as embodied in a pressure gauge of the diaphragm type. It will be apparent to those skilled in the art, however, that the invention is not limited in application to pressure gauges, but may be applied to any device in which it is desired to utilize a settable and calibratable mechanism for translating substantially linear movement to rotary movement. In view of this fact, I do not wish to be strictly limited to the foregoing description but rather define my invention by the annexed claims.

I claim:

1. In a pressure gauge having a diaphragm adapted to be subjected to a pressure differential, motion translating means, a cantilever spring associated with and adapted upon movement to actuate said motion translating means, tension means connecting said diaphragm and said cantilever spring, a fixed support for one end of the spring, a relatively stiff spring plate positioned adjacent said spring and anchored to said support, a clamp spanning said plate and said spring and spaced from the support for adjustably securing said spring to said plate to vary the point of fulcrum of said spring, and zero setting means associated with said clamp for tilting said clamp, said plate and said spring to vary the disposition of said spring relative to said translating means.

2. In a pressure gauge having a diaphragm adapted to be subjected to a pressure differential, motion translating means, a cantilever spring associated with and adapted upon movement to actuate said motion translating means, flexible tension means connecting said diaphragm and said cantilever spring, a fixed support for one end of the spring, a relatively stiff spring plate positioned adjacent said spring and anchored to said support, a clamp spanning said plate and said spring and spaced from the support for adjustably securing said spring to said plate to vary the point of fulcrum of said spring, an arm secured to one end of said clamp, and means for adjustably supporting the other end of said arm, whereby said arm may be tilted to tilt said clamp, said plate and said spring to vary the disposition of said spring relative to said translating means.

3. A device for calibrating and zero setting a gauge comprising a standard, a leaf spring secured at one end to said standard and extending therefrom, a relatively stiff spring plate secured to said standard and engaging said spring throughout a portion of the length of said spring, a clamp spanning said spring and said plate and movable throughout the length of said plate for varying the point of fulcrum of said spring, an arm secured to said clamp, a post adjustably supporting said arm, means associated with said post for adjusting the point of support of said arm, said spring being adapted to be moved by the physical effect to be measured, and means for indicating the movement of said spring, said clamp being movable to vary the point of fulcrum to vary the resiliency of said spring to thereby vary the calibration of said indicating means, said arm being movable to tilt said clamp to vary the normal disposition of said spring with respect to said standard to thereby effect a setting of said indicating means at its zero point.

4. In a pressure gauge, the combination of an annular base, a pressure-responsive flexible diaphragm closing the opening in the base, a transparent cup-shaped housing, sealing means for removably sealing said transparent cup-shaped housing to the top of said base to define with said diaphragm a first chamber, said sealing means including a marginal upstanding flange on the base, a resilient sealing gasket at the foot of the flange, and an interengaging means on said marginal flange and said transparent housing whereby rotation of the housing with respect to the base firmly seals said housing against said resilient gasket, a lower cup-shaped housing secured to the under side of the base and defining with the diaphragm a second chamber, means for connecting each of said chambers to separate bodies of fluid, spring means mounted in said first chamber on said base and connected to said diaphragm for movement therewith in at least one direction, indicating means positioned in said first chamber and arranged to be actuated by said spring means, said indicating means including a rotatable indicating member visible from the exterior of the gauge through said transparent housing, and means for controlling the flexibility of said spring means.

5. A pressure gauge as set forth in claim 4, in which said indicating means includes a frictionless magnetic coupling device between said rotating indicating member and said spring means.

6. In a pressure gauge having a diaphragm adapted to be subjected to a pressure differential, motion-translating means, a cantilever spring associated with and adapted upon movement to actuate said motion-translating means, a member connecting said diaphragm and said cantilever spring, a fixed support for one end of the spring, a relatively stiff spring plate positioned adjacent said spring and anchored to said support, a clamp spanning said plate and said spring and spaced from the support for adjustably securing said spring to said plate to vary the point of fulcrum of said spring, an arm secured to one end of said clamp, and means for adjustably supporting the other end of said arm, whereby said arm may be tilted to tilt said clamp, said plate and said spring to vary the disposition of said spring relative to said translating means.

7. In a pressure gauge having a diaphragm adapted to be subjected to a pressure differential, motion-translating means, a cantilever spring associated with and adapted upon movement to actuate said motion-translating means, a tension member connecting said diaphragm and said cantilever spring, a fixed support for one end of the spring, a relatively stiff spring plate positioned adjacent said spring and anchored to said support, and a clamp spanning said plate and said spring and spaced from the support, said clamp being adapted to adjustably secure said spring to said plate to vary the point of fulcrum of said spring.

8. In a pressure gauge having a diaphragm adapted to be subjected to a pressure differential, motion-translating means, a cantilever spring associated with and adapted upon movement to actuate said motion-translating means, a collapsible tension member connecting said diaphragm and said cantilever spring, a fixed support for one end of the spring, a relatively stiff spring plate positioned adjacent said spring and anchored to said support, and a clamp spanning said plate and said spring and spaced from the support, said clamp being adapted to adjustably secure said spring to said plate to vary the point of fulcrum of said spring.

References Cited in the file of this patent

UNITED STATES PATENTS

| Number | Name | Date |
|---|---|---|
| 1,146,202 | Ogilvie | July 13, 1915 |
| 1,504,785 | Reynolds | Aug. 12, 1924 |
| 1,739,297 | Eynon | Dec. 10, 1929 |
| 1,841,651 | Sprague et al. | Jan. 19, 1932 |
| 1,870,058 | Levine | Aug. 2, 1932 |
| 2,079,069 | Johnson | May 4, 1937 |
| 2,084,623 | Pigott | June 22, 1937 |
| 2,223,640 | Rineer | Dec. 3, 1940 |
| 2,339,847 | Ellison | Jan. 25, 1944 |
| 2,340,395 | Lindermann | Feb. 1, 1944 |
| 2,417,449 | Rubin | Mar. 18, 1947 |
| 2,503,372 | Bagley | Apr. 11, 1950 |
| 2,509,644 | Kinderman | May 30, 1950 |